Figure 1:
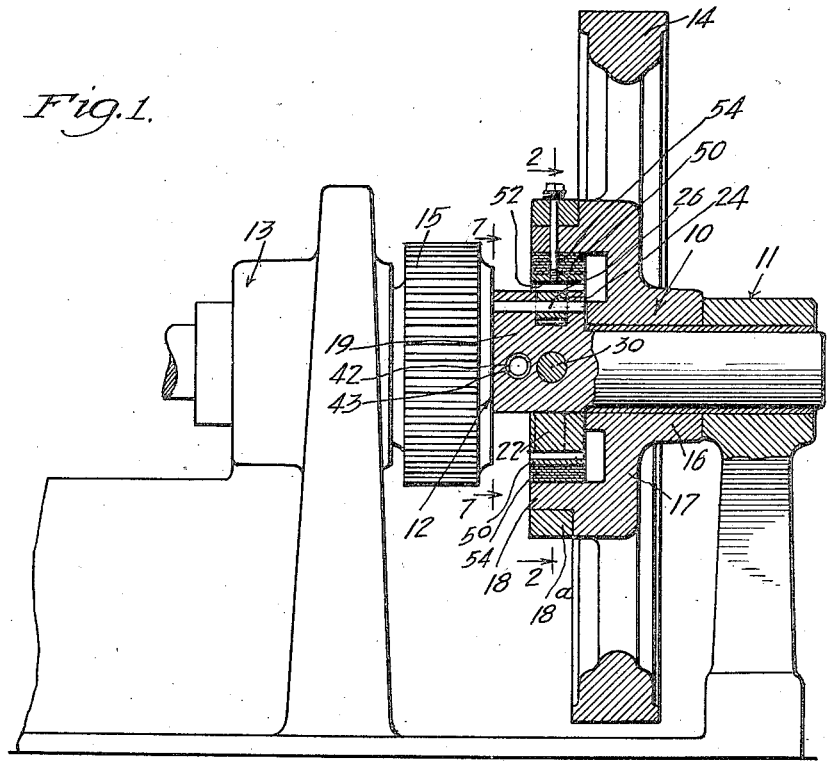

June 26, 1923.

H. P. EILERS

CLUTCH

Filed July 27, 1920

1,460,234

3 Sheets-Sheet 1

Inventor:
Hio P. Eilers,
By
his Attorneys

June 26, 1923.
H. P. EILERS
CLUTCH
Filed July 27, 1920   3 Sheets-Sheet 2
1,460,234
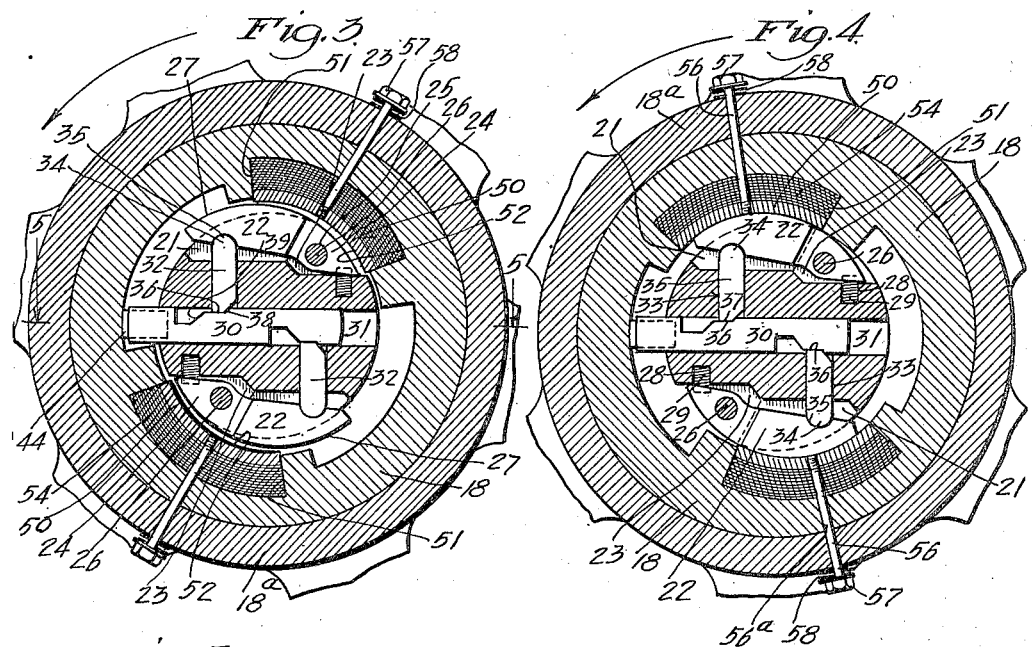
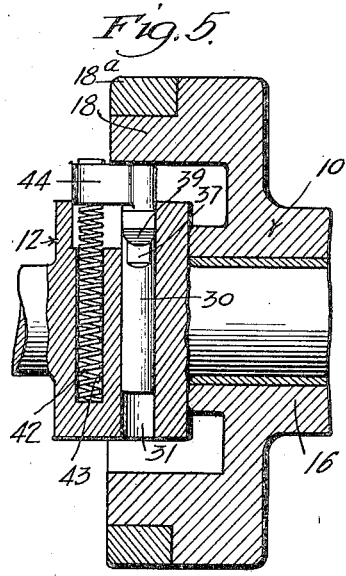
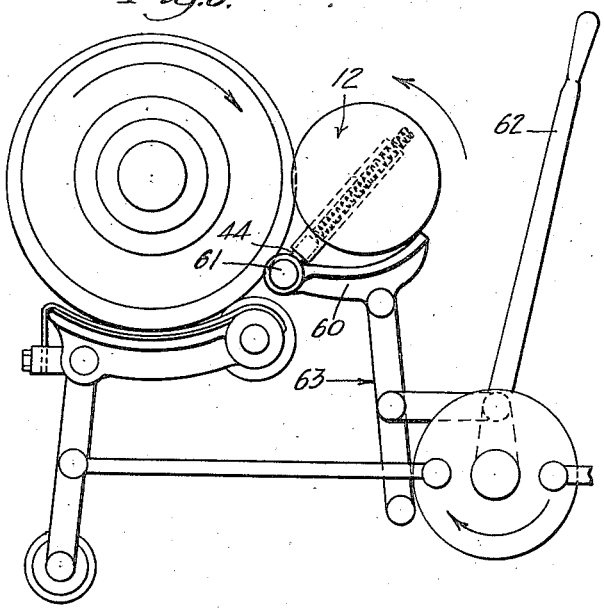
Inventor:
His P. Eilers
By
his Attorney June 26, 1923.
H. P. EILERS
CLUTCH
Filed July 27, 1920
1,460,234
3 Sheets-Sheet 3
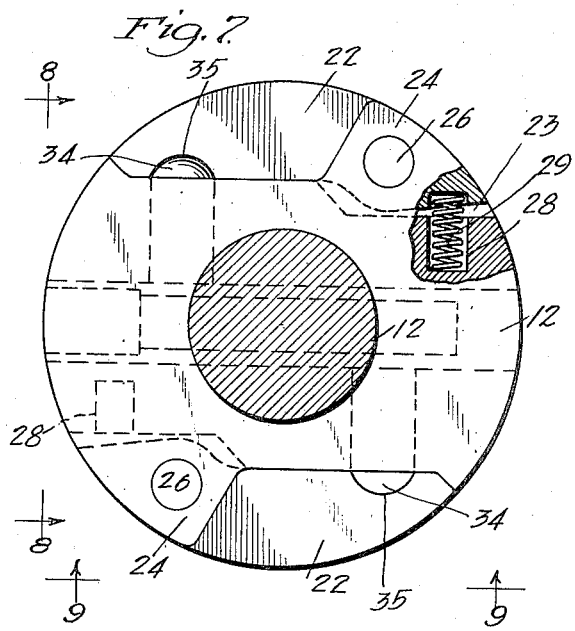
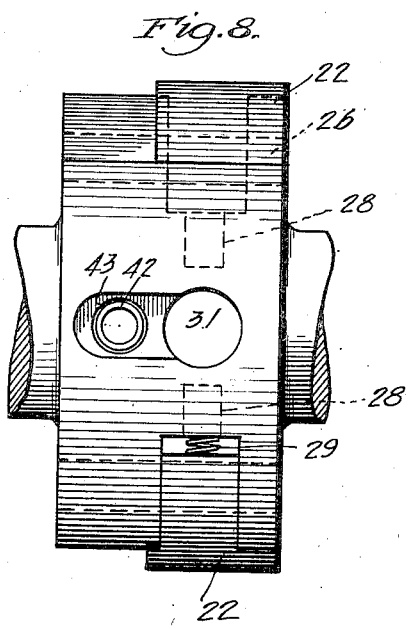
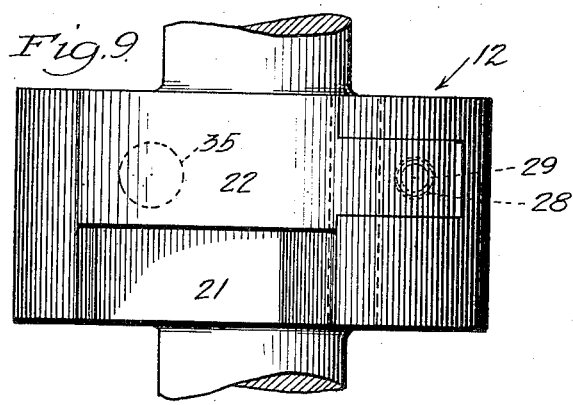
Inventor:
Hio P. Eilers.
By 
his Attorneys Patented June 26, 1923.

1,460,234

UNITED STATES PATENT OFFICE.

HIO P. EILERS, OF LOS ANGELES, CALIFORNIA.

CLUTCH.

Application filed July 27, 1920. Serial No. 399,303.

*To all whom it may concern:*

Be it known that I, HIO P. EILERS, a citizen of the United States, residing at Los Angeles, in the county of Los Angeles, State of California, have invented new and useful Improvements in Clutches, of which the following is a specification.

This invention has to do with a clutch and it has for an object the provision of a simple, durable and positive clutch particularly adapted for use in power presses, stamping or punching machines, and other machines of that general character.

The clutch provided by the present invention may be said to belong to that class of clutches generally known as positive clutches, as it is designed particularly to operate under circumstances which require action such as is had with positive clutches, while at the same time it embodies certain features and characteristics common to clutches such as are generally known as friction clutches. The clutch is particularly adapted for use in machines wherein it is desired that the driven member be suddenly and positively connected with the driving member for one or more revolutions and then suddenly disconnected therefrom. It will be understood however that the nature of the present invention is such as to make it not limited in any way to any specific use or application.

In machinery of the general character above mentioned considerable difficulty is constantly had with the clutch mechanisms heretofore provided. The principal difficulty experienced has been that of breaking and excessive wearing of clutch parts due to their being suddenly put under maximum load, while other difficulties have been in obtaining easily operating and controllable mechanisms simple and inexpensive mechanisms, etc.

It has been an object in the provision of the present invention to provide a simple, durable and effective clutch mechanism which will overcome the above mentioned and other like difficulties and which is applicable to various sizes, designs and weight of machines. In overcoming these difficulties the clutch has been constructed so that it can be suddenly thrown in to cause positive driving connection between the drive and driven members without causing the load to be applied to any of its parts in the form of a blow. A frictional and resilient connection is made between the members in a manner to gradually yet quickly increase in effectiveness until a positive connection is made. The relative movement between the two members during the making of the connection is very small and therefore negligible. This manner of operation entirely eliminates the danger of parts being broken by sudden operation and also prevents excessive strains being set up in and throughout the entire mechanism which is arranged in connection with the driven member.

A particular feature of the invention is the simple and accurate manner in which the clutch may be operated or controlled. The construction may be such that the drive and driven members will always be connected in a certain relative position, or in one of certain relative positions. The mechanism of the clutch also permits of easy and quick operation and is therefore accurate and convenient for use.

Another noteworthy feature of the invention is the simple, compact and inexpensive construction provided by the invention which makes it desirable for practical application and of particular commercial value.

Other objects and features of the invention not herein specifically referred to or pointed out will be understood from the following detailed description of a preferred embodiment of the invention throughout which reference is had to the accompany drawings, in which—

Figure 2:
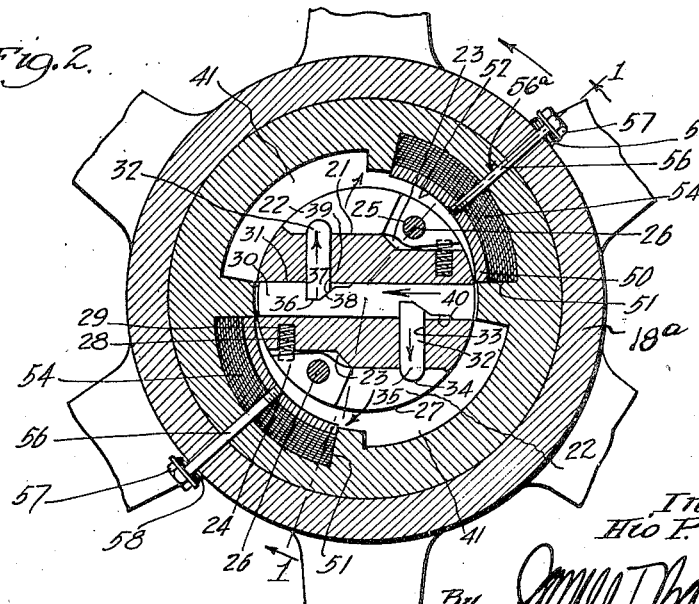

Fig. 1 is a longitudinal sectional view of the clutch mechanism, being a view taken as indicated by line 1—1 on Fig. 2; Fig. 2 is a transverse sectional view of the mechanism, being a view taken as indicated by line 2—2 on Fig. 1 and showing the clutch in its out or disengaged condition; Fig. 3 is a sectional view similar to Fig. 2 showing the mechanism in a position where it has just been thrown in and the frictional engagement between the drive and driven member is about to take place; Fig. 4 is a sectional view similar to Figs. 2 and 3 showing the mechanism in position where the drive and driven members are positively connected by a wedging action; Fig. 5 is a detailed sectional view taken as indicated by line 5—5 on Fig. 3; Fig. 6 is a more or less diagrammatic view showing a typical control mechanism applicable for use in connection with the clutch; Fig. 7 is a face view of the driven member, independent of the drive member, being a view taken as indicated by line 7—7 on Fig. 1; Fig. 8 is a view of the parts shown in Fig. 7 viewed as indicated by line 8—8 on Fig. 7; and Fig. 9 is a view of the parts shown in Figs. 7 and 8 viewed as indicated by line 9—9 on Fig. 7.

Throughout the drawings numeral 10 designates the drive member which is rotatably carried on a portion of the driven member 12 which, in turn, is rotatably carried in suitable bearing structures 11 and 13. In the particular construction shown in the drawings the drive member is adapted to be operated or driven through a wheel 14 formed on, or with, it, while the driven member is adapted to operate the driven mechanism through a suitable gear 15 formed or mounted on it. The drive member 10 and gear 15 are arranged on the driven member 12 between the bearing structures 11 and 13 in order that the various parts may be maintained in the proper relative positions. It will be understood that the particular arrangement and construction of parts shown in the drawings, and herein so far set forth, is merely that best suited for application or use in one particular type of machine and is merely set forth for purpose of illustration and to facilitate the disclosure of the invention.

The drive member 10 is preferably a cast member having a bearing portion 16 which is carried on the driven member 12, a radially disposed flange portion 17 arranged to extend from the bearing portion 16, and a substantially cylindrical sleeve or drum portion 18 arranged to extend from the flange 17. The drum 18, of the drive member 10, is preferably reinforced by a band 18ª shrunk around it, and is sufficiently large and long to extend over, and practically encase, the operating parts of the driven member 12.

The driven member 12 is in the form of a shaft having an enlarged portion 19 formed on it to come, or be, within the drum 18 and to which, or on which, is secured the various operating parts of the driven member. The enlarged portion 19 is round and is concentric with the shaft portions of the driven member, as will be clearly seen from inspection of the drawings. The enlarged portion 19 is formed at opposite sides with recesses 21 to receive wedge jaws 22, and is also formed with recesses 23, in connection with the recesses 21, to receive lugs 24 formed on the wedge jaws 22. The lugs 24 are formed with bores 25 to receive pins 26 carried in the enlarged portion 19 to extend through the recesses 23. By this construction the wedge jaws 22 are pivotally connected to the enlarged portion 19 in a simple, strong and effective manner.

The wedge jaws 22 are formed so that their outer faces 27 are of the same curvature as the enlarged portion 19, and are arranged and pivotally carried in the recesses 21 and 23 so that when they are seated in the recesses 21 their outer faces 27 are continuous, or concentric, with the outer face of portion 19. Bores 28 are formed in the portion 19 to open into the bottom of recesses 23 so that springs 29 can be arranged in them in a manner to engage the outer end portions of the lugs 24 and thereby cause the wedge jaws to be normally seated in the recesses 21 in the manner shown in Fig. 2. The springs 29 also act to take up play or lost motion between the various parts and thereby prevent the mechanism from becoming noisy.

An operating rod 30 is slidably carried in a bore 31 formed diametrically through the portion 19 in a manner to cause operation of pins 32 which are arranged to engage and operate the wedge jaws 22. The pins 32 are carried in suitable bores 33 so that they are at right angles to the operating rod 30 and so that they engage the wedge jaws 22 near their outer ends. The ends 34 of the pins 32 which engage the wedge jaws 22 are preferably curved or rounded to seat in suitable sockets 35 formed in the under sides of the wedge jaws. This construction prevents rotation of the pins 32 and causes them to effectively engage the wedge jaws at all times during the various movements of the mechanism. The inner ends of the pins 32 which engage the operating rod 30 are flat at 36 and are beveled or form wedges at 38. The operating rod is recessed or notched so that when it is in the position shown in Fig. 2 it will have flat portions 37 in position to engage the flat end portions 36 on the pins 32 and beveled or wedge portions 39 to engage the portions 38 on the pins 32. The manner in which the operating rod 30 is notched and the manner in which the inner ends of the pins seat in the notches in the operating rod is clearly illustrated in Fig. 2. With this construction movement of operating rod 30 in the direction indicated by the arrow in Fig. 2 causes outward movement of the pins 32 in the bores 33 due to the wedging action of the wedge surfaces 39 against the wedge surfaces 38. The outward movement of the pins 32, as indicated by the arrows in Fig. 2, causes outward swinging of the wedge jaws 22, as indicated by the arrows in Fig. 2. The outward movement of the pins 32 continues with outward movement of the operating rod until wedge surfaces 39 pass out of engagement with the wedge surfaces 38 which allows the flattened surfaces, or ends, of the pins to engage or be carried on the flattened portions 40 formed on the operating rod. The manner in which the flat portions 36 engage and are carried on the flat portions 40 is clearly shown in Figs. 3 and 4, which figures clearly illustrate the manner in which the wedge jaws are positively held out by such positioning of the operating rod. With this form of construction the wedge jaws can be very easily returned to their in positions at any time while the wedge surfaces 38 and 39 are in engagement but positively cannot be moved in when the flat portions 36 and 40 are in engagement. When the flat portions 36 and 40 are in engagement any forces tending to move the jaw members in are transmitted through the pins 32 to the operating rod.

From the various figures of the drawings it will be noted that the operating rod 30 is of such a length as to extend practically completely through the bore 31 in portion 19 when it is in the position shown in Fig. 2, thereby causing it to project from the portion 19 immediately upon its being moved in the direction indicated by the arrow in Fig. 2. The interior of the drum 18 is made to more or less closely fit the portion 19 except at certain recessed parts 41. This construction prevents outward movement of the operating rod except when it is opposite the recesses 41 and therefore prevents operation of the wedge jaws 22 and consequently the clutch except at such times when the drive and driven members are in certain predetermined relative positions.

In order that the operating rod 30 will tend to move outwardly, as indicated by the arrow in Fig. 2, at all times except when it is positively held against such movement in the manner hereinafter to be described, a spring 42 is carried in a socket 43, formed in the portion 19 parallel with the bore 31, to engage a lug 44 formed at the end of the operating rod. A portion of the wall between the socket 43 and bore 31 is cut away to receive the lug 44 when the operating rod is in the position shown in Fig. 2, and the lug 44 is made sufficiently large that it never moves completely out of the portion 19 upon outward movement of the operating rod. The spring 42 is a comparatively heavy spring and is sufficiently strong to overcome the resistance of springs 29 and, to cause quick movement of the operating rod upon its coming in register with one of the recesses 41.

When the means holding the operating rod 30 against outward movement is released and the drive member has moved to a position where the operating rod is opposite one of the recesses 41 the rod is quickly thrown out by the action of spring 42, thereby causing the wedge jaws 22 to be moved to their out positions, as shown in Fig. 3 of the drawings. When the wedge jaws are thus thrown out, they project beyond portion 19 and are no longer concentric with it. Immediately upon the wedge jaws being thrown out they are engaged by curved plates 50 carried in recesses 51 formed in the inner face of the drum 18. The plates 50 are formed so that their outer faces 52 have the same curvature as the outer faces 27 of the wedge jaws and they are carried in the sockets 51 at the same eccentricity relative to the axis of the drum as the outer faces of the wedge jaws are eccentric relative to the axis of the portion 19 when the jaws are out as illustrated in Figs. 3 and 4. The plates 50 are not carried solidly in the recesses 51 but are supported on a plurality of comparatively thin plates 54 formed to fit one over or against the other in the recesses 51. The plates 54 are preferably made by ordinary manufacturing processes so that they are all concentric with the plates 50 and so that they fit or bear together with ordinary accuracy. To provide means for holding the plates 50 and the plates 54 together and in place in the recesses 51 rods 56 are connected to the plates 50, extend through the plates 54, outwardly through bores 56ª in the drum 18, and carry nuts 57 on their outer ends. Spring washers 58 are preferably provided on the rods 56 under the nuts 57 so that the plates will at all times be resiliently held together.

In Fig. 3 of the drawings the mechanism is shown where the operating rod has just moved outwardly to cause throwing out of the wedge jaws so that they are about to be engaged by, or in fact are just being engaged by, the plates 50. As the drive member continues to move around, in the direction indicated by the arrows in the drawings, it causes the plates 50 to be moved against the wedge jaws 22 until the faces of the plates bear against the faces of the wedge jaws. During the time that the connection is being made the outer end portion of the operating rod moves circumferentially through the recess 41 from the position shown in Fig. 3 to that shown in Fig. 4. It will be readily seen from these figures that the relative movement between the drive and driven members during the making of the connection is comparatively small and therefore negligible. From the time the plates 50 first engage the wedge jaws 22 there is frictional connection between the drive and driven members which starts rotation of the driven member. This frictional connection increases in intensity until the plates 50 seat squarely or tightly on the wedge jaws and until the plates 50 have moved along the wedge jaws and all play has been taken up between the plates 54, which are back of the plates 50. In practice the parts are so designed and proportioned that the plates 50, plates 54 and wedge jaws 22 become concentric at the time all play is taken up between the plates 54 and the connection between the drive and driven members becomes positive. In practice when the plates 54 are made by ordinary manufacturing processes there is possibly about a thousandth of an inch space between them which can be taken up during the wedging of the plates 50 on the wedge jaws 22. With a plurality of plates 54 back of the plates 50 there is a considerable amount of resiliency of cushioning action due to the spaces between the plates 54 from the time the plates 50 first engage the wedge jaws until they are finally firmly seated on them. The amount of resiliency had due to the plates 54 will depend largely upon the accuracy with which the plates are made, upon the number of plates, and other like circumstances and therefore constructions may be made to suit various requirements. Further the amount of relative movement between the drive and driven members during the making of the connection depends upon the resiliency had by the plates 54 and the amount of movement which takes place in the plates. Therefore this factor may also be made to suit any particular requirements. It will be readily understood that when there is no more space to be taken up between the plates 54, that the plates 50 wedge solidly against the wedge jaws 22 and thereby make a solid and positive connection between the drive and driven members.

From the foregoing description it will be readily understood how the action of the mechanism is to form a gradually increasing resilient frictional connection between the drive and driven members which causes the driven member to be gradually, yet very quickly, picked up, or started, in rotation before the positive drive connection is made between the two members to cause them to operate in unison or together. With this manner of operation there is positively no hammering action between any of the parts and none of the parts are subject to blows which might cause them to fail.

Due to the fact that the plates 50 are eccentrically carried in the drum 18 the space between the portion 19 and the inner parts of the drum, except those parts at the recesses 41, are not all the same distance from the portion 19. In other words, the eccentricity of the plates 50 causes spaces to be formed between the portion 19 and the inner parts of drum 18 into which the operating rod 30 might extend if released at certain times. The construction and proportioning of the various parts is such that any slight movement of the operating rod into any of the spaces causes considerable outward movement of the wedge jaws. That is, none of the above mentioned spaces are sufficiently large to permit of the rod 30 moving outwardly enough to throw the wedge jaws completely out, or to allow the rod 30 to move a sufficient amount to move the surfaces 36 into engagement with the surfaces 40. Under these circumstances it is impossible for the wedge jaws to grip any part, or parts, of the drum as any forces against the faces 27 of the wedge jaws, while the wedge faces 38 and 39 are in engagement, merely cause inward movement of the wedge jaws, inward movement of the pins 32 and retraction of the operating rod.

As means for causing movement of the operating rod inwardly and to hold the operating rod in at such times as may be desired, a suitable foot 60 is pivotally mounted at 61 so that it can be moved into the path of the lug 44, as clearly shown in Fig. 6. It will be readily understood, that when the foot 60 is swung up to a position such as is shown in Fig. 6, how the portion of lug 44 which extends beyond the drum 18 will engage the shoe and be moved inwardly as it moves along the curved face of the shoe. When the shoe 60 is up, and as long as the shoe 60 is up, the operating rod will be held in and thereby cause the clutch to be out, while as soon as the shoe 60 is lowered, and during such times as the shoe 60 is lowered, the operating rod is allowed to be out and thereby causes the clutch to be in. It will be understood how inward movement of the operating pin causes the flat surfaces 40 to move away from the surfaces 36 thereby allowing the pins 32 and wedge jaws 22 to be moved inwardly by the springs 29. Any suitable mechanism may be provided for operating the shoe 60, for instance as shown in the drawings the shoe may be connected with a suitable hand lever 62 through a toggle mechanism 63. It will be understood that this particular means for controlling the clutch is merely typical of that which may be employed and therefore does not limit or restrict the invention in any way.

Although I have herein set forth this invention in a form embodying two wedge jaws it will be understood that such disclosures is not intended to act in any way to limit the scope of the invention. It may be stated that an arrangement of wedge jaws diametrically opposite each other is desirable in that it provides a balanced structure.

Having described a preferred form of my invention, I claim:

1. In combination, a drive member, a driven member, a wedge jaw carried by one of the members, an eccentric plate carried by the other member to be engaged by the jaw, and resilient means between the plate and the member that carries it adapted to be compressed, when the jaw engages the plate, to a point where it is no further resiliently compressible, so that the jaw and plate at first engage frictionally and then solidly.

2. In combination, a drive member, a driven member, a jaw pivotally mounted on one member, means for operating the jaw to project from said member, means to prevent operation of the operating means except when the drive and driven members are in a certain relative position, two plates carried at spaced points on the other member and either adapted to engage and form a wedging connection with the jaw when it is projecting from the first mentioned member, and means in connection with the plates to allow them a limited resilient movement during the making of a wedging connection.

3. In combination, a drive member, a driven member, a jaw carried by one member, a single member for operating the jaw to an extended position and then positively holding it in the extended position, and a plate carried by the other member to cooperate with the jaw when it is extended to frictionally engage and subsequently wedge against the jaw when the jaw is extended.

4. In combination, a drive member, a driven member, a wedge jaw carried by one member, yielding means for normally holding the wedge jaw in an in position, means for operating the wedge jaw to an extended position, a plate carried by the other member to engage the wedge jaw in its extended position, and means in connection with the plate to allow it a limited yielding movement when it engages the wedge jaw.

5. In combination a drive element, a driven element, a jaw pivotally connected to one element, an operating member in connection with the jaw and adapted to be actuated to move the jaw to and positively hold the jaw in a projecting position, yielding means tending at all times to actuate the operating member, control means for the operating member, a plate carried by the other element to frictionally engage and subsequently wedge onto the jaw in its projecting position, and means in connection with the plate to allow it only a limited resilient movement during the frictional engagement.

6. In combination, a drive element, a driven element, a jaw pivotally connected to one element, an operating member carried by said element, said operating member being formed with a wedge surface and a flat surface, a connecting member between the jaw and the operating member, the connecting member being formed with a wedge surface and a flat surface to cooperate with the wedge surface and flat surface of the operating member to cause movement of the jaw to a projecting position and positively hold the jaw in such position, resilient means tending at all times to actuate the operating member, control means for the operating member, a plate carried by the other element to frictionally engage and subsequently wedge onto the jaw in its projecting position, and means in connection with the plate to allow it a limited resilient movement during the frictional engagement.

7. In combination, a drive element, a driven element, a jaw pivotally connected to one element, an operating member carried by said element, said operating member being formed with a wedge surface and a flat surface, a connecting member between the jaw and the operating member, the connecting member being formed with a wedge surface and a flat surface to cooperate with the wedge surface and flat surface of the operating member to cause movement of the jaw to a projecting position and positively hold the jaw in such position, resilient means tending at all times to actuate the operating member, control means for the operating member, means to prevent operation of the operating member except when the drive and driven elements are in a predetermined relative position, a plate carried by the other element to frictionally engage and subsequently wedge onto the jaw in its projecting position, and means in connection with the plate to allow it a limited resilient movement during the frictional engagement.

8. In combination a drive element, a driven element, a jaw pivotally connected to one element, yielding means for normally keeping the jaw in an in position, an operating member carried by said element, said operating member being formed with a wedge portion and a plane portion, a connecting member between the jaw and the operating member, the connecting member being formed with a wedge portion and a plane portion to cooperate with the wedge portion and plane portion of the operating member to cause movement of the jaw to a projecting position and positively hold it in such position upon actuation of the operating member, means tending at all times to actuate the operating member, control means for the operating member, means for preventing operation of the operating member except when the drive and driven elements are in a predetermined relative position, a plate carried by the other element to frictionally engage and subsequently wedge onto the jaw in its projecting position, and means in connection with the plate to allow it a limited resilient movement during the frictional engagement, said last mentioned means comprising a plurality of plates arranged together back of said plate.

9. In combination, a drive element, a driven element, a jaw pivotally connected to one element, an operating member carried by said element, said operating member being formed with a wedge surface and a flat surface, a connecting member between the jaw and the operating member, the connecting member being formed with a wedge surface and a flat surface to cooperate with the wedge surface and flat surface of the operating member to cause movement of the jaw to a projecting position and positively hold the jaw in such position, means for actuating the operating member, and a plate carried by the other element to cooperate with the jaw when the jaw is in a projecting position to connect the drive and driven elements.

10. In combination, a drive element, a driven element, a jaw pivotally connected to one element, an operating member carried by said element, said operating member being formed with a wedge surface and a flat surface, a connecting member between the jaw and the operating member, the connecting member being formed with a wedge surface and a flat surface to cooperate with the wedge surface and flat surface of the operating member to cause movement of the jaw to a projecting position and positively hold the jaw in such position, resilient means tending at all times to actuate the operating member, control means for the operating member, means to prevent operation of the operating member except when the drive and driven elements are in a predetermined relative position, and a plate carried by the other element to cooperate with the jaw when the jaw is in a projecting position to connect the drive and driven members.

11. In combination, a drive member, a driven member, a wedge jaw carried by one of the members, an eccentric plate carried by the other member to be engaged by the jaw, and resilient means between the plate and the member that carries it, said resilient means composed of a plurality of resilient elements that are adapted when resiliently compressed to bed down against one another so as to be no further resiliently compressible.

12. In combination, a drive member, a driven member, a wedge jaw carried by one of the members, an eccentric plate carried by the other member to be engaged by the jaw, and resilient means between the plate and the member that carries it, said resilient means composed of a plurality of resilient flat springs lying against each other and adapted when resiliently compressed to bear solidly on each other and then form a solid abutment between the plate and the member that carries it.

In witness that I claim the foregoing I have hereunto subscribed my name this 7th day of July, 1920.

HIO P. EILERS.

Witness:
VIRGINIA BERINGER.